Nov. 20, 1956  L. P. CREIMAN  2,771,560
COMBINATION SWITCH AND INTERLOCK FOR ELECTRICAL DEVICES
Filed Jan. 25, 1956  3 Sheets-Sheet 1

INVENTOR:
LYLE P. CREIMAN,
BY Charles M. Hutchins
HIS ATTORNEY.

Nov. 20, 1956    L. P. CREIMAN    2,771,560
COMBINATION SWITCH AND INTERLOCK FOR ELECTRICAL DEVICES
Filed Jan. 25, 1956    3 Sheets-Sheet 2
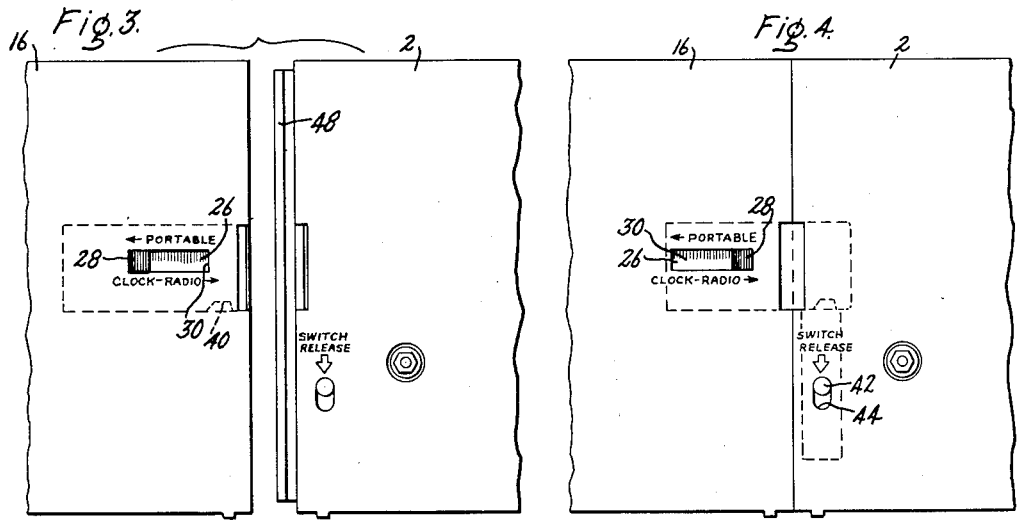
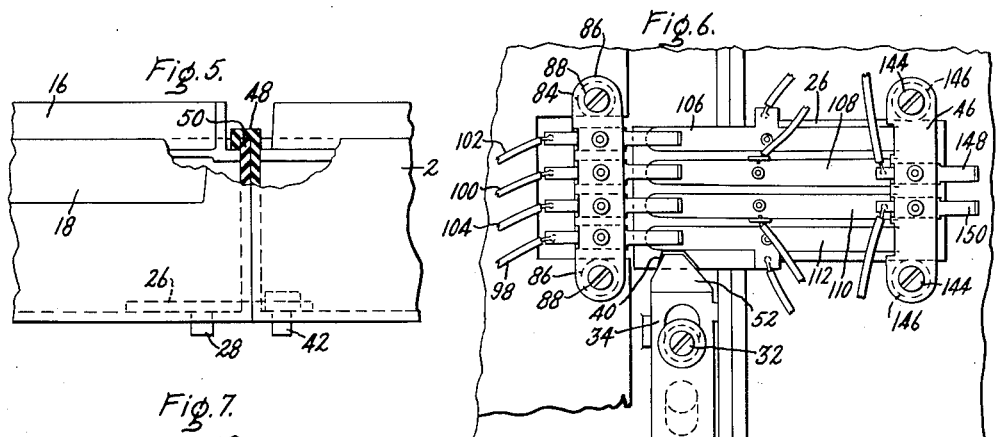
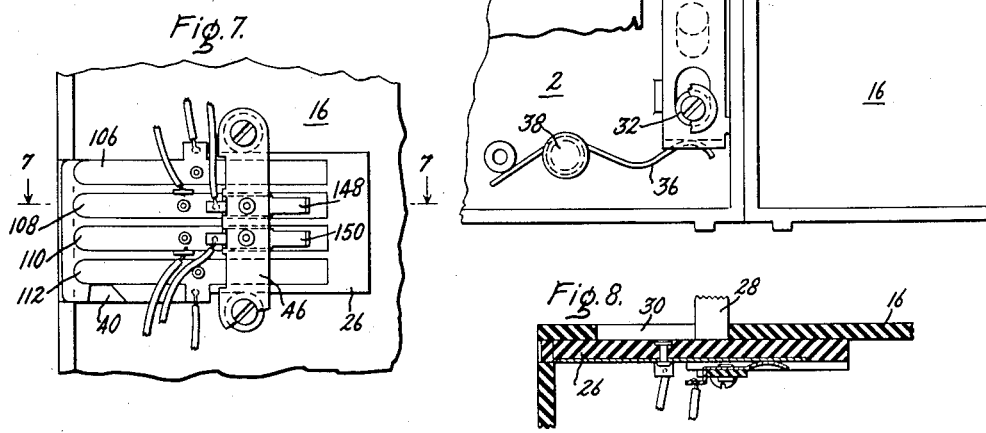
INVENTOR:
LYLE P. CREIMAN,
BY Charles M. Hutchins
HIS ATTORNEY.

INVENTOR:
LYLE P. CREIMAN,
BY Charles M. Hutchins
HIS ATTORNEY.

United States Patent Office 2,771,560
Patented Nov. 20, 1956

2,771,560

COMBINATION SWITCH AND INTERLOCK FOR ELECTRICAL DEVICES

Lyle P. Creiman, Syracuse, N. Y., assignor to General Electric Company, a corporation of New York Application January 25, 1956, Serial No. 561,195

6 Claims. (Cl. 307—156)

This invention relates to a novel means for mechanically and electrically connecting two or more electrical devices to each other.

The utility, adaptability and versatility of numerous electrical devices can be enhanced by the provision of means which will enable to be selectively mechanically and electrically connected to each other. Thus, in various consumer types of electrical appliances such as receivers and sound reproducing equipment, it may be found desirable to provide units performing separate functions to be mechanically and electrically connected to one another as desired by the user. For example, it has been proposed to provide a self-contained clock and A. C. power supply unit and a self contained receiver and battery power supply units which may be selectively attached to one another. In this arrangement the operating potentials for the receiver are supplied from either of the power supplies as desired by the user. Such a construction should be of such a nature that the average user can utilize it to its maximum potential with a minimum of difficulty in assembling and disassembling the elements.

Therefore, it is an object of the invention to provide a novel device for selectively electrically and mechanically attaching electrical devices mounted in separate housings.

It is another object of this invention to provide a novel device to mechanically secure one housing to another by engaging both of said housings and at the same time complete a plurality of electrical connections and which may also break other electrical connections.

It is still another object of this invention to provide a novel means for selectively attaching a self-contained clock and A. C. power unit to a self-contained receiver and battery power unit in which a portion of the structure attaching these two units also constitutes a means for switching to one or the other of the two power supplies.

It is a further object of this invention to provide a novel clock-receiver combination in which a self-contained clock and A. C. power supply unit are selectively connected to a separate self-contained receiver and battery power supply unit by a means which automatically couples operating potentials to the receiver from the proper power supply depending on whether the units are connected or not connected.

Briefly, the objects of my invention are achieved in one form by the provision of one or more movable members carrying a plurality of electrical conductors. The moveable member is mounted in one of two electrical device supporting structures and is engageable in an accommodating opening in another electrical device supporting structure and when so engaged will mechanically join them and make electrical contact with circuitry in each of said devices. In a specific application of my invention I provide a first housing structure which has a clock mechanism mounted therein. A means for converting potential from an A. C. source into suitable receiver operating potentials is also mounted in this housing. Connected to the clock is a switching mechanism in the circuit of the potential converting means, so that the necessary operating potentials may be supplied to the receiver at predetermined times. A second housing structure has a receiver and a battery power supply mounted therein. The two housings are provided with means which are selectively engageable with each other to hold the two units in an assembled position. The moveable member includes a plurality of conductors for coupling the potential of the A. C. power supply to the receiver and may be mounted so as to disconnect the battery power supply therefrom at the same time.

The novel features which are considered to be characteristic of my invention are set forth with particularity in the appended claims. The invention itself, however, both as to its structure and method of operation together with further objects and advantages thereof may best be understood by reference to the following description taken in connection with the accompanying drawings wherein:

Figure 3 is a partial rear view of the clock unit and receiver unit in their disassembled position with the mechanical and electrical connecting means in a withdrawn position;

Figure 4 is a partial rear view of the two units in their assembled position;

Figure 5 is a top view partially in sections illustrating how the two units are held in their assembled position;

Figure 6 is an illustration of the novel means for holding the two units in their assembled position and for switching from one to the other of the two power supplies;

Figure 7 is a view of the switching and holding means withdrawn into one of the two units;

Figure 8 is a view along the line of 7—7 of Figure 7; and

Figure 1:
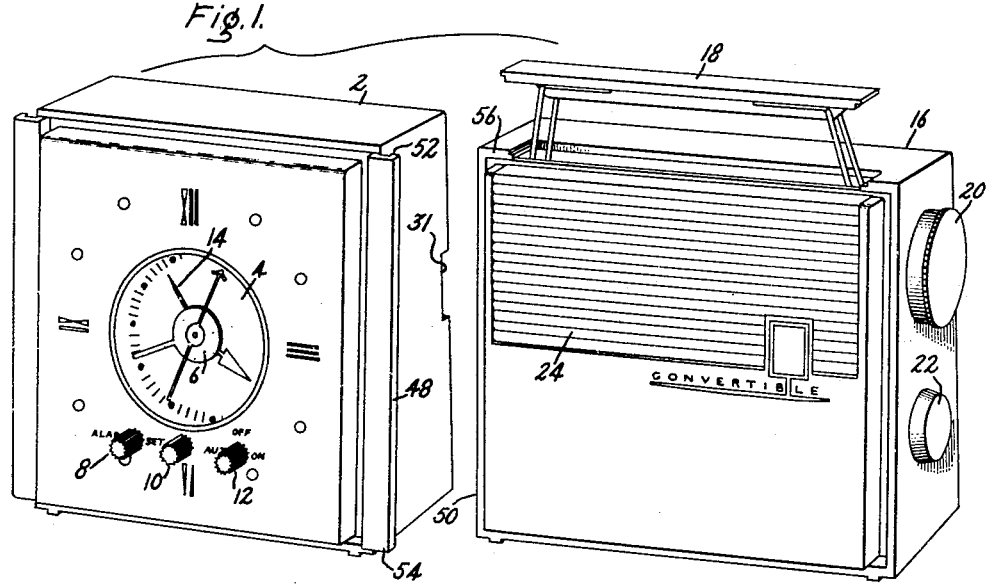
Figure 1 is a front view of a clock-receiver combination wherein the two units are in their disassembled position.
Figure 2:
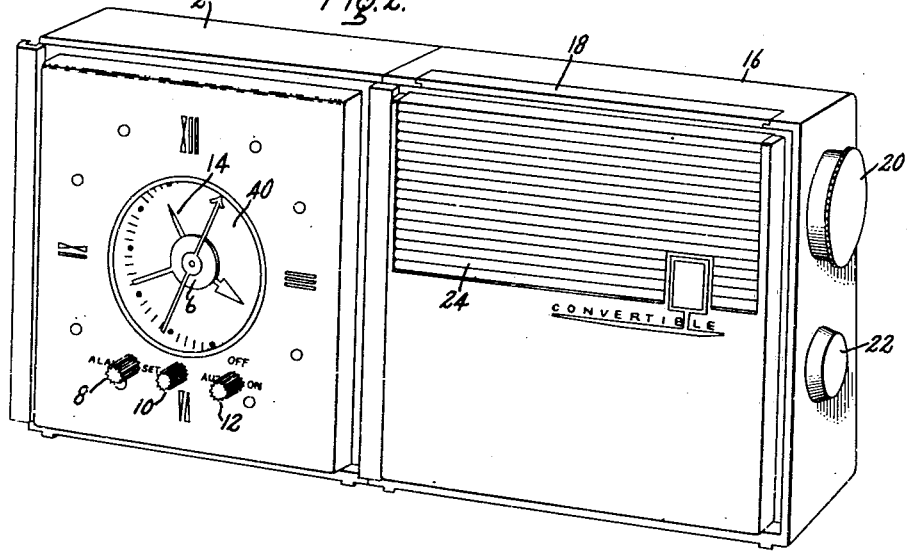
Figure 2 is a front view of the same two units in their assembled position.

Referring now to Figures 1 and 2 of the drawing, there will be seen a clock receiver combination comprising my invention. The receiver illustrated in this instance is a radio receiver, shown by way of example only. Mounted in a suitable housing 2 is a clock unit which has provided on the front thereof the conventional dial 4 and hands 6. The clock unit also includes a first control knob 8 which may be used to set clock mechanism which determines the time at which a switch actuating the receiver is closed. A second control knob 10 may be part of a switching mechanism (not shown) which is closed to actuate the receiver and is opened to turn it off after a predetermined time by the action of the clock mechanism. A third knob 12 may be provided to determine the action of the switch, that is the knob 12 may be turned to a first "automatic" position, in which instance the clock will actuate the receiver switch according to the time setting of an indicator 14 the position of which is determined in rotating knob 8. Alternatively it may be turned to an "on" position in which case the receiver actuating switch will be closed and the receiver immediately activated.

The receiver is mounted in its own self-contained housing 16 and may include a carrying handle 18 which can be folded into the receiver housing as shown in Figure 2. A tuning control knob 20 is provided on the side of the receiver housing and a second knob 22 which functions to control an "on-off" switch and as a volume control is also provided thereon. Access for the loudspeaker forming a part of the receiver is provided by means of the grilled area 24. As seen in these figures, the clock unit 2 may function as a separate unit from the receiver unit 16 which is detachable therefrom and may be transported very easily in the manner of the well known "portable" radio.

The movable member whereby these two units are made attachable and detachable from one another in one form of my invention is constituted in part by a plate 26 which is slidably mounted in the receiver unit. A handle 28 is provided thereon for the purpose of moving the slidable plate which handle is movable in a slot 30 provided in the receiver housing. An opening 31 is provided in the clock housing into which the plate 26 may move. Mounted on studs 32 in the clock housing is a moveable latch 34. A spring 36 wound around a stud 38, secured to the clock housing, presses against the bottom of the latch 34 to force it into a notch 40 provided in the plate 26. An actuating projection 42 is provided on the latch 34, and is moveable in a slot 44 provided in the clock housing 2. A bracket or bridge 46 mounted in the receiver functions to guide the sliding plate 26 and also serves another purpose to be brought out hereinafter. The clock housing 2 is provided with a channel-shaped flange 48 which extends along the vertical face thereof on the front of the housing opposite the opening 31 and on the side normally engaging the receiver 16. When it is desired to assemble the clock to the receiver, the channel-shaped flange 48 is caused to engage over a front side wall 50 of the receiver. The sliding plate 26 is moved through the opening 31 into the clock housing, forcing the latch 32 down by virtue of the action of the plate on a camming face 52 of the latch against the spring 36, until the latch engages in the notch 40 of the sliding plate and is held by the spring.

The moveable member in this form of my invention is a sliding plate. Alternatively, it may be an eccentrically mounted disc or a semi-circular disc having a pivot at the center of its diameter. Further, the spring pressed latch may be mounted in the same housing at the moveable member and the housing attached thereto will include only an opening into which the moveable member can move.

In the operation of this device, when it is desired to have the clock and receiver units function as a clock-radio combination, the channel-shape flange 48 of the clock 2 is engaged over the side wall 50 of the receiver 16. Sliding plate 26 is closed until the notch 40 is engaged by the spring pressed latch 34 as described above. At this point, since the flange 48 is engaged at its top 52 and bottom 54 by the upper wall 56 and the bottom wall (not shown) of the receiver housing, it is incapable of any longitudinal movement and will secure the fronts of the two members together. The sliding plate 26 couples the two members in the rear in the manner described above. When it is desired to separate these two units, the knob 42 of the latch 34 is depressed downwardly withdrawing the latch from the notch 40 on the plate 26. The plate 26 is then moved by moving the knob 28 in a direction away from the clock unit and withdrawing the plate from the unit. A slight forward bending of the two units will cause them to separate and they are then in a condition to be used separately.

Figure 9:
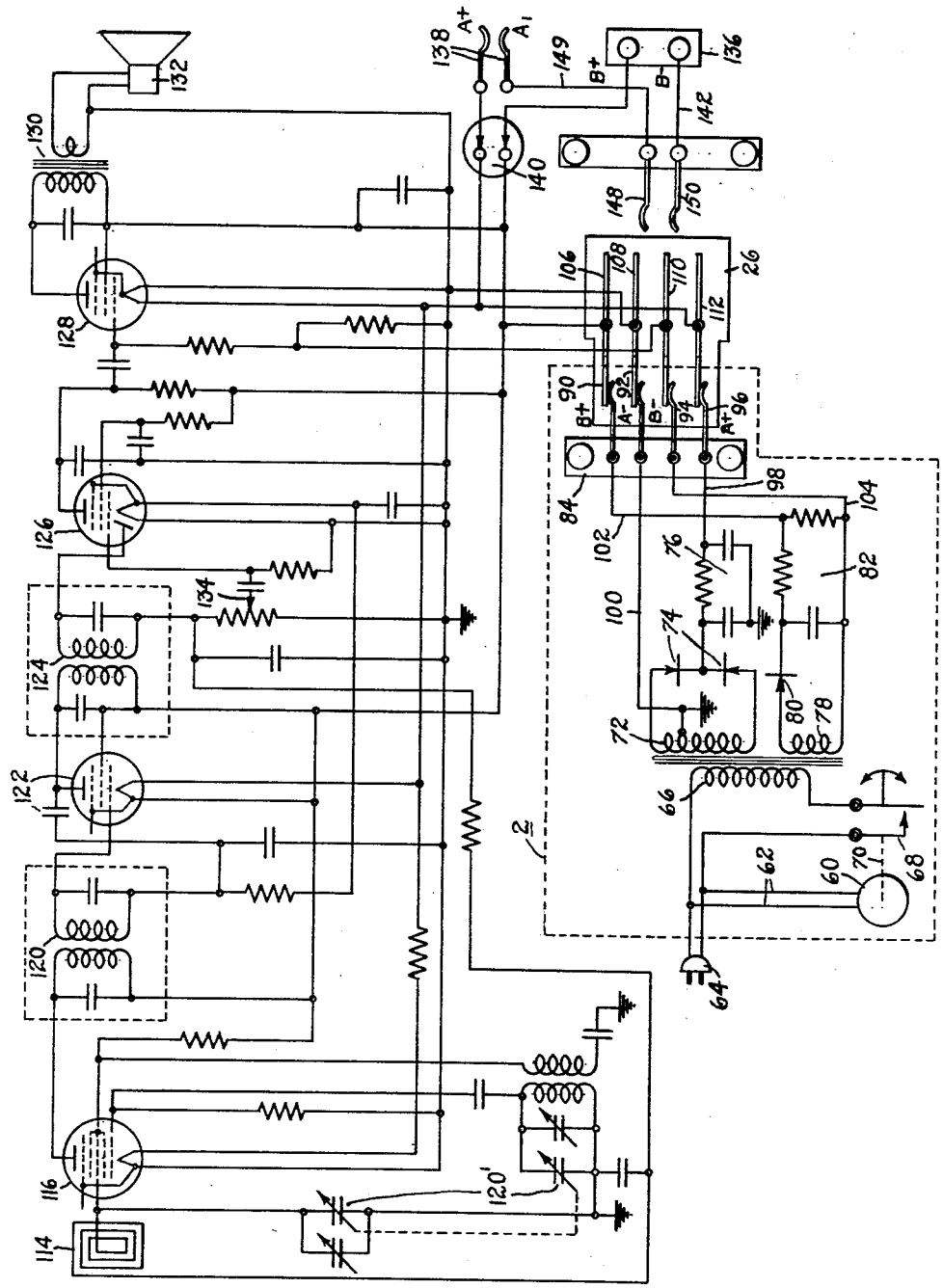
Figure 9 is a schematic illustration of the circuit of a clock-receiver combination incorporating my invention.

As may be seen in Figure 9, the clock unit 2 forming a part of my invention includes a clock mechanism 60 which draws its operating current over conductors 62 which are coupled to a male plug 64 which may be inserted into a suitable electrical outlet. Connected in parallel with the clock is the primary 66 of a radio power supply transformer. A serially connected switch 68 is in the circuit of the transformer and is normally opened unless closed by action of the clock mechanism which is connected thereto as schematically illustrated at 70. Alternatively, it may be closed manually by the operator as pointed out above. A relatively low voltage winding 72 of the transformer constituted a secondary providing what is normally termed the A+ voltage required for receiver operation. The output of this secondary winding is rectified by the full-wave rectifier 74 and filtered by the network 76. A secondary winding 78 provides the normal B+ voltage which is rectified by the rectifier 80 and filtered by the network 82. As may be seen in Figure 9, a bridge or support 84 is provided in the clock unit and is mounted thereon by means of the hollow studs 86 into which the threaded members 88 are secured after passing through the bridge 84. Secured to the bridge 84 are a plurality of spring contacts 90, 92, 94, and 96. The output of the rectifier 74 is coupled after being filtered by the network 76 via the conductor 98 to the contact 96 which provides the normal low voltage A+ output. A conductor 100 is connected to the spring contact 92 and provides the A— return to ground. The B+ relatively high voltage output is coupled over a conductor 102 to the spring contact 90, while the conductor 104 coupled to the spring contact 94 provides the return to ground for this relatively high voltage. It may thus be seen that the clock unit incorporates a clock mechanism, a switching mechanism, and a power supply capable of furnishing the operating potentials for a standard home receiver unit. This single self-contained unit performs two functions as it may operate as a standard clock and alarm in the manner well known in the art, or it may be used to actuate the power supply for the receiver as desired or at predetermined times according to the setting of the clock mechanism.

The slidable plate 26 which functions to secure the receiver unit to the clock unit also functions to carry the operating potentials for the receiver from the clock unit housed power supply. This is accomplished by the provision of the busses 106, 108, 110, and 112, which are mounted on the plate. When the clock-unit and receiver-unit are in their assembled relationship, the plate 26 moves under the bridge 84 and the spring contacts 90, 92, 94, and 96 contact the busses 106, 108, 110, and 112, respectively. At this time complete circuits are closed leading to the receiver and if the switch 68 should be closed either automatically by the clock mechanism or manually by the operator the necessary operating potentials will be furnished.

The receiver illustrated performs no part of my invention but is shown in by way of example only as it is obvious that it may take numerous forms. However, in the illustrated form the receiver comprises the conventional antenna 114 and a multi-grid tube 116 connected as an oscillator-convertor. Tuning is accomplished by means of the ganged capacitors 120' in the oscillator circuit and in the R. F. circuit. A first transformer 120 couples the output of the oscillator convertor 116 to an I. F. amplifier 122 while second transformers couples the output of amplifier 122 to a detector and audio amplification stage 126. A final audio output stage 128 is transformer coupled as at 130 to a loudspeaker 132. A suitable volume control potentiometer 134 may be provided in the audio amplification stage 126.

Since it is desired to have the receiver operate as a portable receiver independent of any fixed power supply, a battery power supply is also provided in the receiver unit. The battery supply takes the form of a conventional B+ battery 136 and the A+ batteries (not shown) which are connected between the spring contacts 138. A "on-off" switch 140 is provided for completing the circuit from the battery power supply and may be ganged with the volume control 134 which is actuated by the knob 22 on the side of the receiver housing. The B— return for the battery is furnished by a conductor 142. The bridge 46 is secured to the receiver housing by means of the threaded members 144 which engage in the internally threaded studs 146 on the receiver housing. Secured to the bridge 46 are a pair of spring contacts 148 and 150. The B— return conductor 142 is connected to the spring contact 150 while an A— return conductor 149 is connected to the spring contact 148. In order to operate the receiver from its battery power supply, the switch 140 is closed and the slidable plate 26 is moved to the right as illustrated in Figure 9 so that the spring contact 148 engages the buss 108 and the spring contact 150 engages the buss 110.

From the preceding description, it can be seen that when the plate 26 is in a position to couple the clock unit 2 contained power supply to the receiver-unit 16, the battery power supply is out of the receiver circuit and alternatively, when the plate 26 has been moved to the right as shown in Figure 9 and couples the battery power supply to the receiver circuit, the clock contained power supply is out of the circuit.

In this manner the following advantages are obtained: When it is desired to operate the receiver as a portable radio, only those elements which are necessary for its operation in this manner need to be transported by the user. The weight and space occupied by a power supply intended for use in a relatively stationary receiver are not present and a much lighter more compact device is thereby obtained. On the other hand when it is desired to operate the receiver either as a clock-radio or as a standard relatively stationary receiver, the necessary power for such operation is obtained from the components in the clock unit 2.

It is the advantage of this invention that the switching means which enables this mode of operation to be accomplished also functions as the device coupling the two units to one another and the switching operation is carried out automatically when the two units are separated. The entire combination affords the advantage of what would normally require two entirely separate receiver units in the home receiver field.

While the invention has been described by reference to a particular embodiment thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent of the United States is:

1. A clock-receiver combination comprising a first housing, means in said first housing providing an input for a source of alternating potential, means for rectifying the alternating potential, a circuit connecting said input means to said rectifying means, a first switch interposed in said circuit, a clock in said housing coupled to said switch for closing said switch at predetermined times to permit the flow of said alternating potential to said rectifying means, a second housing, a receiver in said second housing, connections in said second housing for coupling the rectified potential to said receiver, means for releasably attaching said first housing to said second housing, said last mentioned means including a member slidably engageable with said first and second housings, a plurality of contacts on said member coupling the output of said rectifying means to said connections when said member is engaging both of said housings.

2. A clock-receiver combination comprising a first housing, means providing for an input, an alternating potential in said first housing, means for rectifying the alternating potential, said rectifying means providing a relatively high rectified potential output and a relatively low rectified potential output, a circuit coupling said input means to said rectifying means and including a switch, a clock connected to said switch for closing said switch at a predetermined time, a second housing, a receiver mounted in second housing, connectors mounted in said second housing forming a part of said receiver for coupling operating potential thereto, battery means in said second housing for supplying operating potentials to said receiver, means for releasably attaching said first housing to said second housing, said last mentioned means including a member slidably engageable with both of said housings, a plurality of contacts on said member, said contacts being selectively engageable with said rectifier means output and said battery means to supply operating potentials for said receiver from either said rectifying or said battery means.

3. A clock-receiver combination comprising a self-contained clock unit including a power supply, a self-contained receiver unit including a battery power supply unit, means for releasably attaching said units to one another, said means including a member slidably mounted in one unit and engageable in the other unit, connectors in said receiver unit for coupling operating potentials to the receiver, busses on said slidable means for coupling said power supply to said connectors when units are attached and said member engages both of said units and for coupling said battery power supply to said connectors when said units are not attached.

4. A clock-receiver combination comprising a self-contained clock unit including a power supply, a self-contained receiver unit including a battery power supply unit, means for releasably attaching said units to one another, said means including a plate slidably mounted in said receiver unit, said clock unit having an opening provided therein, said opening being disposed adjacent said receiver unit when said units are to be attached, said plate being slidable through said opening into said clock unit, movable latch means in clock unit engageable with said plate when said units are attached, connectors in said receiver unit to couple operating potential thereto, busses on said plate engageable with said connectors and said clock unit power supply when said units are assembled and engageable with said connectors and said battery power supply when said units are not assembled.

5. A clock-receiver combination as defined in claim 4 wherein said releasable attaching means is also a lip on one unit overlying a portion on another unit.

6. A clock-receiver combination as defined in claim 5 wherein said plate has a notch therein, and said moveable latch means includes a spring normally pressing a portion of said latch means into said notch when said units are assembled.

No references cited.